United States Patent
Castillo et al.

[11] Patent Number: 5,912,454
[45] Date of Patent: Jun. 15, 1999

[54] SYSTEM AND METHOD FOR DETECTING A RELATIVE CHANGE IN LIGHT INTENSITY

[75] Inventors: Leonardo Del Castillo, Redmond; Margaret E. Winsor, Seattle, both of Wash.

[73] Assignee: Microsoft Corporation, Redmond, Wash.

[21] Appl. No.: 08/886,054

[22] Filed: Jun. 30, 1997

[51] Int. Cl.$^6$ ................................................. G01J 1/32
[52] U.S. Cl. .................. 250/205; 250/221; 250/214 AL; 273/374
[58] Field of Search .................................. 250/205, 226, 250/214 AL, 221; 340/555–557; 273/371, 373, 374, 386; 472/6, 10, 70, 71

[56] References Cited

U.S. PATENT DOCUMENTS

| | | |
|---|---|---|
| 3,493,674 | 2/1970 | Houghton . |
| 3,743,767 | 7/1973 | Bitzer et al. ............................ 178/5.6 |
| 3,891,792 | 6/1975 | Kimura ................................ 178/5.8 R |
| 3,900,887 | 8/1975 | Soga et al. ................................. 360/18 |
| 3,993,861 | 11/1976 | Baer ........................................ 178/5.6 |
| 4,186,413 | 1/1980 | Mortimer ................................ 358/146 |
| 4,207,704 | 6/1980 | Akiyama ................................. 46/232 |
| 4,540,176 | 9/1985 | Baer .................................... 273/148 B |
| 4,599,664 | 7/1986 | Fischer .................................... 358/84 |
| 4,655,431 | 4/1987 | Cooper .................................... 358/145 |
| 4,660,033 | 4/1987 | Brandt .................................. 340/825.72 |
| 4,807,031 | 2/1989 | Broughton et al. ..................... 358/142 |
| 4,840,602 | 6/1989 | Rose ....................................... 446/175 |
| 4,846,693 | 7/1989 | Baer ........................................ 434/308 |
| 4,847,699 | 7/1989 | Freeman ................................. 358/343 |
| 4,847,700 | 7/1989 | Freeman ................................. 358/343 |
| 4,864,607 | 9/1989 | Mitamura et al. ...................... 379/388 |
| 4,902,887 | 2/1990 | Everett, Jr. ............................. 250/221 |
| 4,930,019 | 5/1990 | Chu ......................................... 358/335 |
| 4,949,327 | 8/1990 | Forsse et al. ............................ 369/58 |
| 5,021,878 | 6/1991 | Lang ........................................ 358/93 |
| 5,108,341 | 4/1992 | DeSmet ................................... 446/299 |
| 5,198,893 | 3/1993 | Lang ........................................ 358/93 |
| 5,270,480 | 12/1993 | Hikawa .................................... 84/645 |
| 5,655,945 | 8/1997 | Jani ......................................... 446/175 |

FOREIGN PATENT DOCUMENTS

WO/91/10490 7/1991 WIPO .

*Primary Examiner*—Que T. Le
*Attorney, Agent, or Firm*—Jones & Askew, LLP

[57] ABSTRACT

A system having a sensor, a feedback loop comprising a controllable load and an integrator, and a comparator. The light filter is matched to the sensor to allow enough light to be sensed while appearing dark. Current produced by the sensor is received by the controllable load, across which a voltage is detected. Upon a relative change in light intensity, a difference between the detected voltage and a reference voltage is integrated by the integrator over an integration time to produce a feedback signal. The feedback signal completes the feedback loop by controlling the controllable load's impedance and adjusting the value of the detected voltage back to the value of the reference voltage. Thus, relative changes in light intensities are detected while thereafter adjusting to the ambient light conditions. When the difference between the detected voltage and the reference voltage is greater than a preset value, the comparator alters an output voltage. The altered output voltage indicates enough of a relative change in light intensity that the interactive device can appropriately respond to the new covered or uncovered sensor condition. The integration time may be reduced within the integrator when going to a brighter light intensity condition incident to the sensor to meet user expectations. Furthermore, a timer circuit may be used to reset the integration time by providing a reset signal to the integrator once a predefined period of time elapses after the sensor is covered or uncovered.

29 Claims, 5 Drawing Sheets

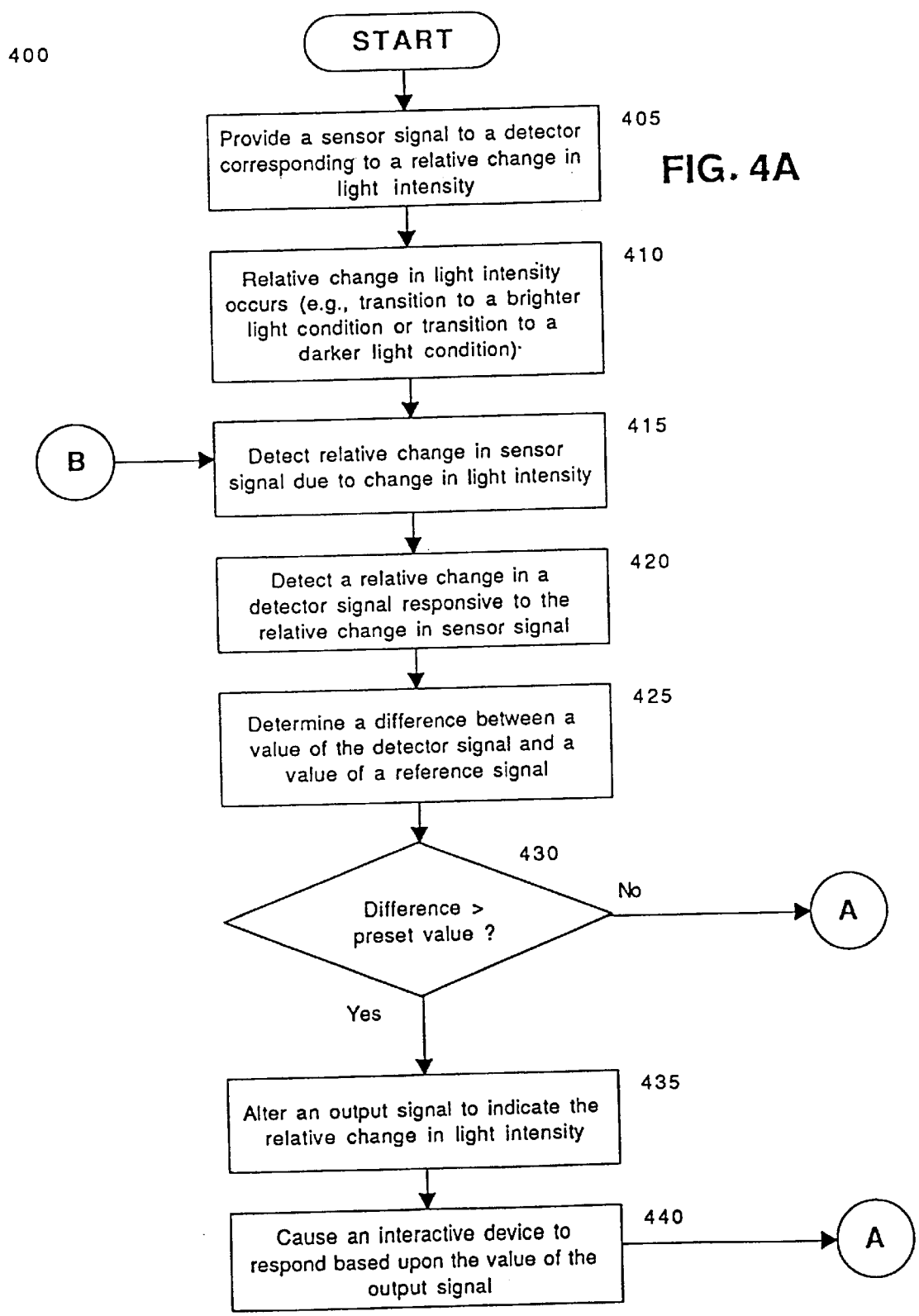

SYSTEM AND METHOD FOR DETECTING A RELATIVE CHANGE IN LIGHT INTENSITY

REFERENCE TO RELATED APPLICATIONS

This application is related to U.S. application Ser. No. 08/795,710 entitled "PROTOCOL FOR A WIRELESS CONTROL SYSTEM"; Ser. No. 08/795,698 entitled "SYSTEM AND METHOD FOR SUBSTITUTING AN ANIMATED CHARACTER WHEN A REMOTE CONTROL PHYSICAL CHARACTER IS UNAVAILABLE"; Ser. No. 08/795,711 entitled "METHOD AND SYSTEM FOR DETERMINING LIP POSITION AND MOUTH OPENING OF AN ANIMATED CHARACTER"; and Ser. No. 08/794,921 entitled "A SYSTEM AND METHOD FOR CONTROLLING A REMOTE DEVICE"; Ser. No. 08/885,385 entitled; "METHOD AND SYSTEM FOR ENCODING DATA IN THE HORIZONTAL OVERSCAN PORTION OF A VIDEO SIGNAL"; and Ser. No. 08/907,423 entitled "A SYSTEM AND METHOD FOR CREATING APPENDAGE MOVEMENT UTILIZING A SERVO MECHANISM WITH A SELF-ALIGNING CLUTCH", all of which are commonly assigned to Microsoft Corporation, the assignee of the present application.

TECHNICAL FIELD

This invention generally relates to light detecting electronics and, more particularly described, relates to a system and method for detecting a relative change in light intensity incident to a sensor on an interactive device.

BACKGROUND OF THE INVENTION

Interactive toys, also generally referred to as interactive devices, are becoming more advanced. An example of such an interactive device is a remotely controllable toy character with which a user may interact as described and illustrated in the above related U.S. Patent Applications. In the above-related U.S. Patent Applications, the interactive device is also called a controllable device or a remotely controlled performer. Such an interactive device may have electronics, motors, a speaker, touch sensors, and light sensors, each of which may be used by the device when interacting with the user. The focus of the present invention is on interactive devices having light sensors.

In particular, an interactive device may have a light sensor capable of detecting the intensity of light incident upon the sensor. In an example where the light sensors represent the device's eyes, the user may interact with the device by covering and uncovering the sensors in a game of "peek-a-boo". As part of the game of "peek-a-boo," the user may cover the device's sensors (eyes). The device may audibly respond to the user's action and wait for the user to uncover the device's sensors (eyes) as part of the game. Once the device's sensors (eyes) are uncovered by the user and the device detects a change in light, the device can appropriately respond to the user as part of the game.

In such an interactive game, the device needs to respond to a user's action, such as covering or uncovering the device's sensors and causing a variation in the light intensity incident on the device's sensors. Furthermore, the interactive device needs to appropriately respond to a user's action in a wide range of light conditions and in a manner consistent with the user's expectations. However, light detecting or sensing systems may have some problems when attempting to detect relative changes in light intensities in a manner consistent with the user's expectations.

The sensitivity of a light detecting system may be limited because there may be only a very small change in the absolute light intensity. In a low light condition, such as indoors in a poorly lit room with dark walls, the detected change in absolute light intensity when covering up a device's light sensor may be very small. A light detecting system may use the absolute change in light intensity to identify whether the sensor has been covered. However, such a system may not be able to sense or detect enough of an absolute change to properly identify that the device's sensor has been covered. Thus, such a system may have a limited dynamic range for detecting light changes. The fact that covering a light sensor with a human hand typically blocks only about fifty percent of the light makes detecting changes in light intensity even more difficult.

If a light detecting system uses a static, but low threshold to determine changes in light intensity, the light detecting system may be useful in low light situations to identify a covered or uncovered situation. However, by using a given static threshold to determine changes in light intensity, the light detecting system may be limited in use and sensitivity when used in a bright light environment. For example, a typical light sensor may produce 5 microamps of ambient sensor current while uncovered indoors (in fluorescent lighting) and 5 milliamps of ambient sensor current while uncovered in sunlight. When covered by a human hand, the same light sensor may produce about 2.5 microamps indoors and 2.5 milliamps outdoors. A low static threshold used to determine changes in light intensity of 2.5 microamps may make the light sensor too sensitive in the direct sunlight. Mere shadows may be enough to make the interactive device or toy respond inappropriately. On the other hand, a higher static threshold of 2.5 milliamps may work well outdoors in direct sunlight but would likely never be crossed in the indoor, low-light situation. Therefore, using static thresholds for determining changes in light intensity can be problematic when the device is to be used in a wide variety of light conditions and environments. The use of a static threshold can also be problematic when the user expects the device to operate a certain way after the user interacts with the device (e.g., covering or uncovering the device's sensors).

While differing light conditions may pose problems for the functionality of a light detecting system, the light detecting system may also have problems presenting a visual appearance in a manner consistent with the user's expectations. In particular, a user typically expects for a sensor or sensor housing representing the device's eye to be dark or opaque. However, this can be difficult to implement because the dark material making up the sensor or sensor housing must also allow light through it to be sensed by the light detecting system. In summary, light detecting systems for interactive devices may have limited dynamic ranges, may have problems operating appropriately in a wide variety of light conditions, and may have problems meeting a user's expectations of appearance while still functioning as an effective light detecting system.

Therefore, there is a need for a system for detecting a relative change in light intensity (1) which enhances the dynamic range of the system, (2) which adapts the sensitivity of the system to the ambient light incident on the system, (3) which detects the relative change in light intensity based on a ratio of a change in sensor current relative to an ambient sensor current, (4) which provides the same absolute change in output voltage level in response to the same relative change in light intensity regardless of the ambient light conditions, and (5) having a sensor which visually appears to be dark or opaque while still being able to detect enough light to identify an uncovered or covered situation.

SUMMARY OF THE PRESENT INVENTION

The present invention satisfies the above-described needs by providing a system and method for detecting a relative change in light intensity. In general, the system may include an interactive device, such as a remotely controlled, mechanical toy. The interactive device preferably has a processing unit for controlling how the interactive device can respond to user actions. A sensor can be attached to the interactive device to sense light and its intensity. When sensing light intensity, the sensor provides a sensor signal, typically a sensor current, in proportion to the sensed light intensity.

Additionally, the sensor may be attached to or housed within a light filter. The light filter operates to filter light that is then sensed by the sensor. The light filter advantageously appears dark or opaque while still allowing light to pass for detection by the sensor. In other words, the light filter has a spectral transmissivity characteristic allowing the light to pass through the light filter and be sensed by the sensor while also giving the light filter a dark appearance. This is an advantage because the sensor, when housed within or attached to the light filter, can look like the device's eye yet still be able to detect enough light to identify if the sensor has been covered or uncovered.

A detector can be connected to the sensor. When a relative change in the light intensity occurs, the detector can detect a relative change in the sensor signal when compared to an ambient value of the sensor signal. For example, when the sensor provides current in proportion to light intensity, the detector can detect a change in the sensor current when compared to the ambient sensor rather than merely an absolute change in the sensor current.

The detector can then alter an output signal based on a particular ratio representing the relative change in light intensity. The particular ratio is a ratio of the relative change in the sensor signal when compared to the ambient value of the sensor signal. When the particular ratio is greater than a trigger value, the detector alters the output signal. The trigger value is essentially a predetermined ratio or percentage change in the sensor signal relative to the ambient sensor signal. This trigger value is used to detect a relative change in light intensity on the sensor.

The detector typically includes a feedback loop, which is characterized by a controllable load and an integrator. The feedback loop is coupled to the sensor and provides a detected signal, such as a detected voltage, advantageously responsive to changes in the sensor signal relative to the ambient value of the sensor signal. The integrator in the feedback loop may sense the value of the detected signal in response to a relative change in sensor current. The integrator may also integrate the difference between the detected signal and a reference signal over an integration time. By integrating the difference between the two signals, the integrator in the feedback loop provides a feedback signal, preferably to the controllable load. The controllable load of the feedback loop can then adjust the value of the detected signal back to the value of the reference signal in response to the value of the feedback signal.

In this manner, the feedback loop advantageously enhances the dynamic range of the system by ingeniously adapting the sensitivity of the system to the ambient light incident on the system. Thus, the system is able to detect a relative change in light intensity based on a ratio of a change in sensor signal relative to an ambient sensor signal rather than on an absolute change in the sensor signal.

Additionally, as part of the detector, a comparator may be coupled to the feedback loop. The comparator provides the detector's output signal based on a difference between the detected signal and a reference signal. The comparator provides the output signal based upon the sensor signal (e.g., the current from the sensor). The value of the output signal indicates the relative change in the light intensity. Typically, the comparator alters the output signal if the difference between the detected signal and the referenced signal is greater than a preset value. This is advantageous because the comparator provides the same absolute low-to-high logic level change in output signal in response to the same relative change in light intensity regardless of the ambient light conditions.

The comparator may provide the output signal to the interactive device, preferably to the processing unit within the interactive device, to indicate whether the relative change in the light intensity has been detected. In this way, the processing unit can receive the output signal, a kind of status information, and can respond to the output signal appropriately.

Additionally, the integrator's integration time may be varied depending on whether the relative change in light intensity is generated by covering and uncovering the sensor. If the relative change in light intensity is from transitioning from a brighter light condition (e.g., when covering the sensor), the integration time is typically greater than an expected threshold period of time. However, if the relative change in light intensity is from transitioning from a darker light condition (e.g., when uncovering the sensor), the integration time is typically less than the expected threshold period of time in order to quickly adapt to the current ambient light conditions. This advantageously allows the system to meet a user's expectations when interacting with the interactive device. It allows the system to react quickly when it benefits the system to quickly adjust to the ambient light conditions. It also allows the system to react slowly when the interactive device is waiting on additional user actions and input.

Furthermore, the integrator's integration time may be reset depending on the time elapsed since the most recent detected relative change in light intensity. A timer circuit may be connected to the feedback loop, typically to the integrator within the feedback loop. The timer circuit provides a reset signal at a predefined maximum time period after a relative change in light intensity. In response, the integrator can vary the integration time, preferably by resetting the integration time to quickly adjust to the current light conditions. This aspect of the present invention advantageously allows the system to quickly adjust to the ambient light conditions after waiting on additional user actions but without having to wait for a longer period of time to adjust to the ambient light conditions.

In another aspect of the present invention, a method is provided for detecting a relative change in light intensity. The relative change in light intensity may be produced by a transition to a darker light condition (such as when covering a sensor) or by a transition to a brighter light condition (such as when uncovering a sensor). A sensor signal may be provided corresponding to the relative change in light intensity. A relative change in the sensor signal corresponding to the relative change in the light intensity is then detected. In response, a changed value of a detector signal is detected. If a difference between the changed value of the detector signal and a value of a reference signal is greater than a preset value, then an output signal is altered. The altered output signal indicates the relative change in the light intensity. The altered output signal typically causes an interactive device to make a sound or physically move its parts.

A feedback signal is provided for adjusting the changed value of the detector signal back to the value of the reference signal over an integration time. When transitioning from a brighter light condition, the integration time may be greater than an expected threshold period of time. Furthermore, after waiting for a predefined period of time after altering the output signal, the integration time may be reset by providing a reset signal to reset the integration time. In this situation, the value of the detector signal may be adjusted to the value of the reference signal over the reset integration time.

However, when transitioning from a darker light condition, the integration time may be less than an expected threshold period of time to advantageously meet with a user's expectations and to quickly adapt to the ambient light conditions.

The present invention and its advantages, those described above and otherwise, will be appreciated from studying the following detailed description and drawings, and the appended claims.

DETAILED DESCRIPTION OF THE PREFERRED EMBODIMENT

The present invention is directed toward a system and method for detecting a relative change in light intensity. In one embodiment, the invention is incorporated into a system having an interactive device, a sensor on the device, and detecting electronics (a detector) for detecting the relative change in light intensity when a user covers or uncovers the sensor. Briefly described, when the user covers or uncovers the sensor, a relative change in light intensity is sensed by the sensor which results in a relative change in sensor current. The detection electronics detects the relative change in the sensor current compared to an ambient level of the sensor current. In response to the relative change in light intensity, the detection electronics alters the value of an output voltage if the relative sensor current change when compared to the ambient sensor current level is greater than a trigger value. If the detection electronics alters the value of the output voltage, the system indicates that the sensor has been covered or uncovered. The ability to detect relative changes in light intensity, such as when the sensor has been covered or uncovered, in a wide variety of light conditions, is the focus of the present invention.

Figure 1:
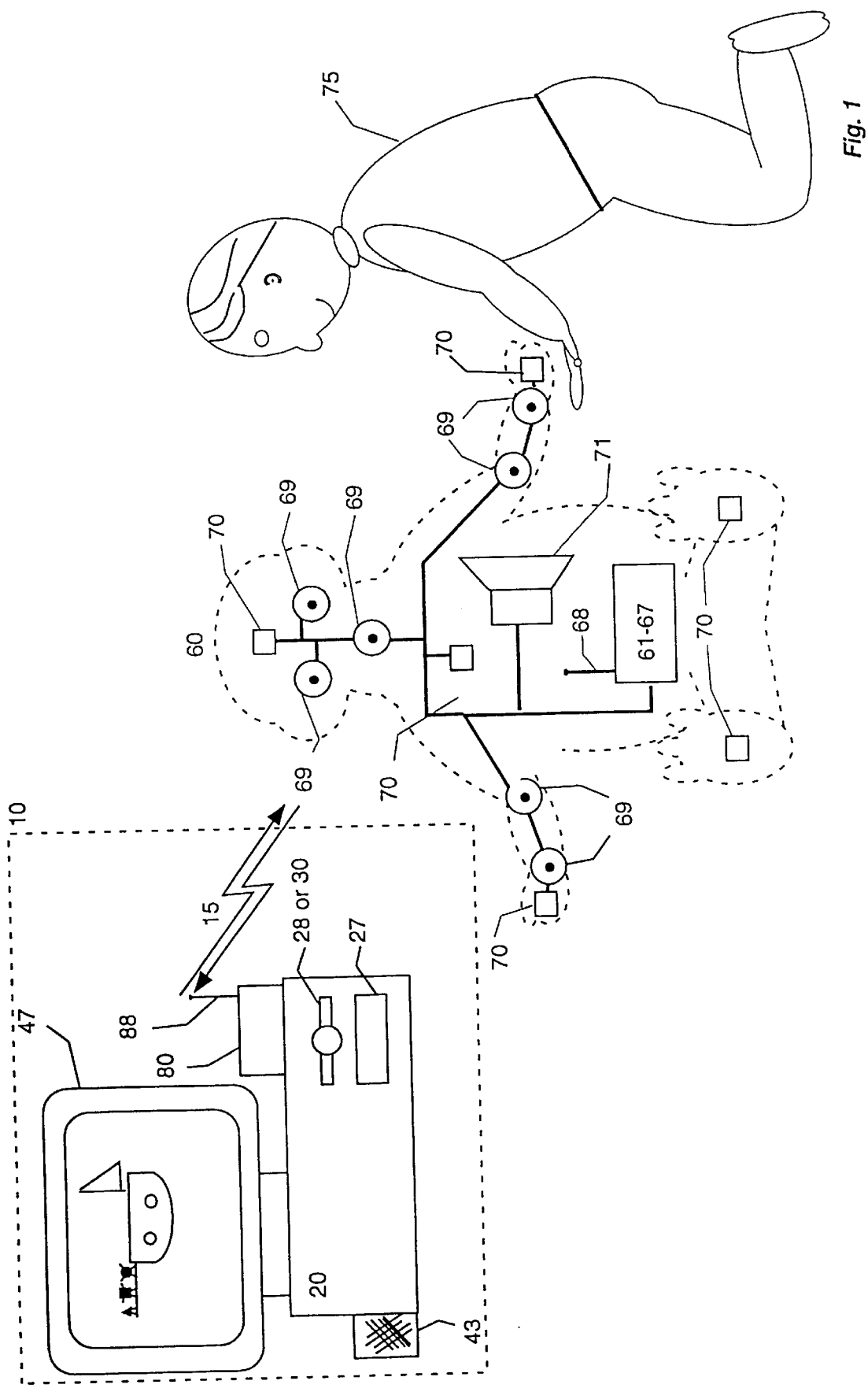
FIG. 1 illustrates an exemplary interactive device in an exemplary operating environment for an embodiment of the present invention.
Figure 2:
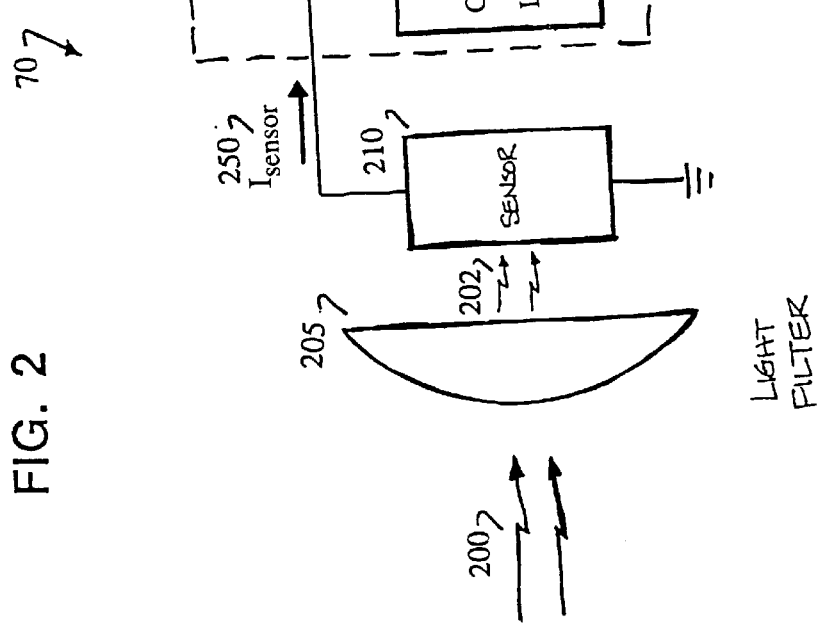
FIG. 2 is a diagram of a light filter, a light sensor, and detecting electronics used within an exemplary interactive device according to an embodiment of the present invention.
Figure 3:
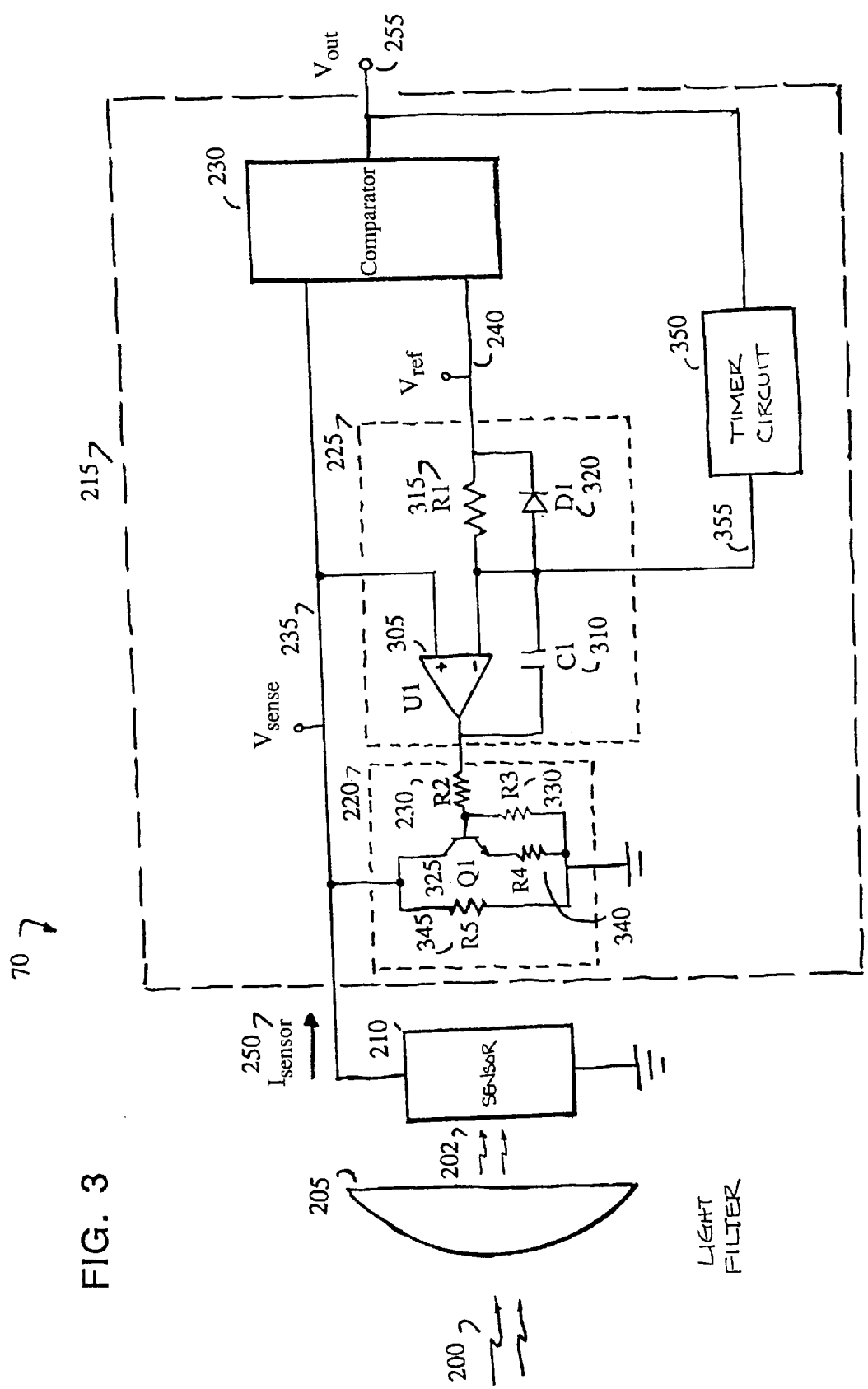
FIG. 3 is a more detailed diagram of a light filter, a light sensor, a controllable load, a comparator and a timer circuit used within an exemplary interactive device according to an embodiment of the present invention.
Figure 4B:
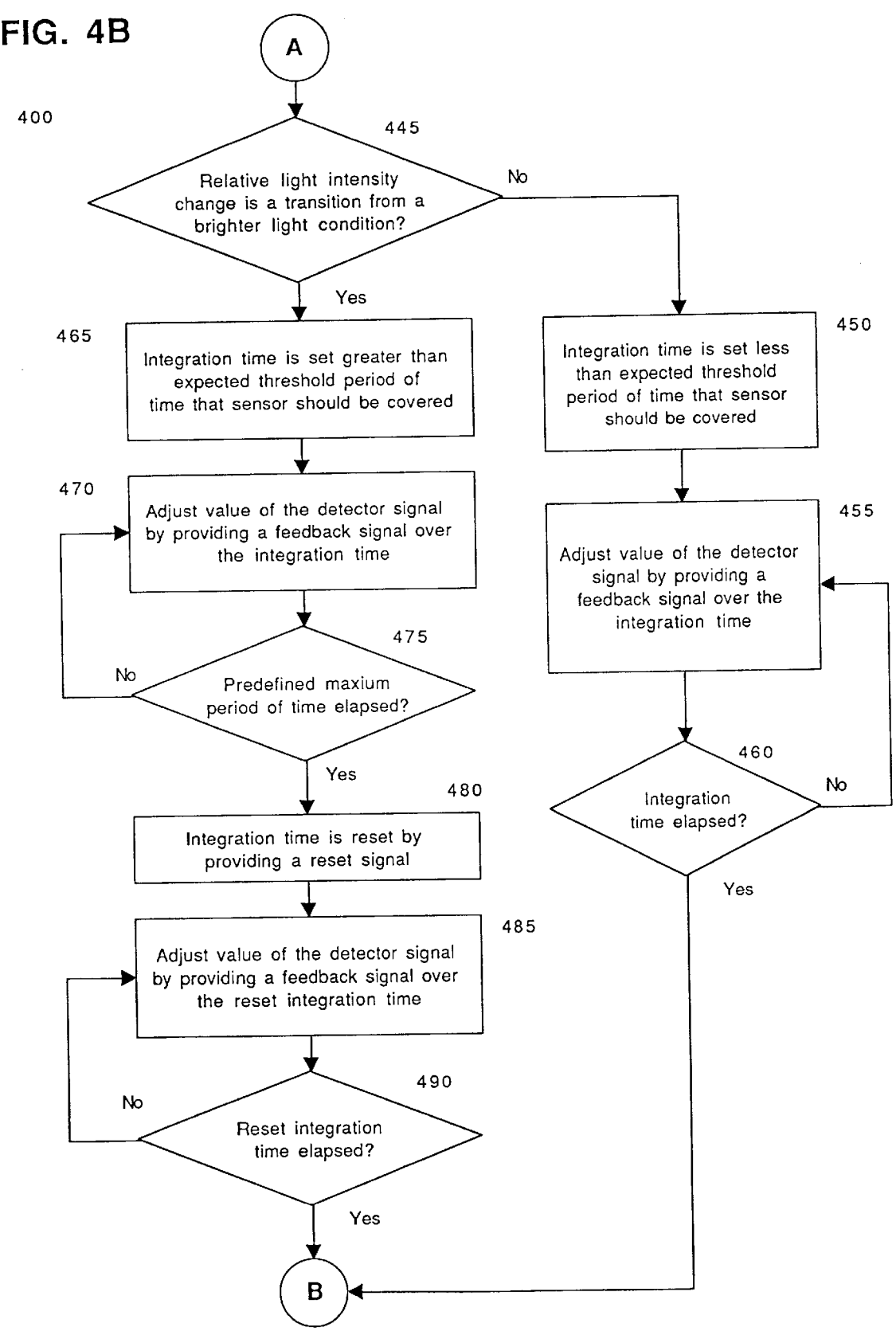
FIG. 4, consisting of FIGS. 4A and 4B, is a flow diagram of the preferred steps for detecting a relative change in light intensity according to an embodiment of the present invention.

The drawings are used to illustrate embodiments of the present invention. FIG. 1 illustrates an exemplary operating environment for an embodiment of the present invention. FIGS. 2 and 3 are schematic/block diagrams of an exemplary light filter, an exemplary light sensor, and exemplary detecting electronics used within an exemplary interactive device capable of detecting relative changes in light intensity. FIG. 4 is a flow diagram of preferred steps for detecting relative changes in light intensity.

Referring now to the drawings, in which like numerals represent like elements throughout the several figures, a suitable operating environment and aspects of the present invention will be described.

Exemplary Operating Environment

Aspects of the present invention are described within the context of a system including an interactive device, which may be remotely controlled or may function in a "stand-alone" mode. FIG. 1 illustrates an exemplary interactive device within an exemplary operating environment.

Referring now to FIG. 1, the exemplary operating environment for embodiments of the present invention is also called a "Realmation" operating environment. "Realmation," derived from combining the words "realistic" and "animation," is associated with a new technology that Microsoft Corporation of Redmond, Wash. is currently developing. An example of a Realmation operating environment includes a master controller 10, such as a computer system 20 with a display 47. The computer system 20 may include a hard disk drive 27, a magnetic disk drive 28, and an optical disk drive 30.

The master controller 10 can communicate with and control an interactive device 60. The master controller 10 provides scenes of animated audio/visual presentation on the display 47 while simultaneously transmitting control and speech data to the interactive device 60. The interactive device 60, in response to receiving the control and speech data, may move and talk in context with the animated audio/video presentation.

In the exemplary Realmation operating environment, an interactive device 60 is a remotely controllable, animated, mechanical toy character developed by Microsoft Corporation. The exemplary interactive device 60 is intended for providing an interactive learning and entertainment device for children. When the interactive device 60 is remotely controlled, the master controller 10 governs the operation of the interactive device 60 while displaying an animated audio/video presentation. The master controller 10 includes a data source (such as the hard disk drive 27), a link master 80 and a display system (such as the computer 20). The data source provides the data and the link master 80 encodes and transmits the data to the interactive device 60.

Remote Control Mode of the Interactive Device

In one embodiment of the present invention, the interactive device 60 is remotely controlled. As a remotely controlled device, the interactive device 60 includes a transceiver 61 for receiving, demodulating, and decoding signals originating from the master controller 10. These signals contain control and speech data. The transceiver 61 may also encode, modulate, and transmit response signals to the master controller 10. An exemplary response signal may be transmitted from a transceiver antenna 68 to an antenna 88 connected to the master controller 10 over a communication channel 15. The transmitted response signal provides the master controller 10 with status information about the interactive device 60. An example of such status information may indicate that the interactive device's light sensor assembly 70 has been covered.

The light sensor assembly 70 includes a light sensor and light detecting electronics. The light sensor may appear as an eye on the interactive device 60 while the light detecting electronics typically remain unseen mounted on a printed circuit board within the interactive device 60. While it is contemplated that the interactive device 60 may include two sensors representing two eyes, an embodiment of the present invention is described below in terms to a single sensor 210. The light sensor assembly 70 and its components are described in more detail below with regard to FIGS. 2 and 3.

Along with the transceiver 61 and the light sensor assembly 70, the interactive device 60 may include a processing unit 62 for processing data and commands and monitoring sensors on the interactive device 60. The processing unit is electrically connected to the light detecting electronics of the light sensor assembly 70. In this manner, the processing unit 62 can receive signals from the light detecting electronics to indicate user actions, such as when a child 75 covers the sensor on the interactive device 60.

The interactive device 60 may also include a speech synthesizer 63, a speaker 71, and one or more servo motors 69. In response to the transceiver 61 receiving data from the master controller 10, the processing unit 62 decodes, interprets, and responds in a manner dictated by the contents of the data. The response of the processing unit 62 may include actuating one or more servo motors 69 and providing input to the speech synthesizer 63 to produce sound played through the speaker 71.

Based upon a user's interactions with the interactive device 60, the light sensor assembly 70 may indicate the sensor (representing the device's eye) is covered. By monitoring output signals from light detecting electronics, the processing unit 62 may collect status information. Upon receiving a request from the master controller 10 or by making an autonomous decision, the processing unit 62 can cause the transceiver 61 to transmit the sensor status information to the master controller 10. In response to receiving the sensor status information, the master controller 10 may alter the animated audio/video presentation. For example, in response to the action of a child 75 covering the sensor (eyes) of the interactive device 60, the animated audio/visual presentation may switch to a game of peek-a-boo.

Stand-Alone Mode of the Interactive Device

In other embodiments of the present invention, the interactive device 60 operates as a stand-alone device. When the interactive device 60 operates in such a stand-alone mode, the master controller 10 and the interactive device's transceiver 61 are not needed in the operating environment. The interactive device 60 is controlled by data and commands stored within the processing unit 62. By monitoring output signals from the light detecting electronics of the light sensor assembly 70, the processing unit 62 may collect status information. For example, the processing unit 62 may receive an output voltage signal from the light detecting electronics indicating that the child 75 has covered the interactive device's light sensors.

In response to receiving the sensor status information, the processing unit 62 may cause the interactive device 60 to respond. Such a response may include actuating one or more servo motors 69 or providing input to the speech synthesizer 63 to produce sounds played through the device's speaker 71.

For example, in response to the action of a child 75 covering the interactive device's sensors (representing the interactive device's eyes), the interactive device 60 may produce sounds asking the child to uncover the device's eyes in a game of peek-a-boo. If the child 75 keeps the interactive device's sensor covered past a predefined period of time, the interactive device 60 may ask the child 75 to play another game.

Light Sensor Assembly in the Interactive Device

As previously mentioned, the interactive device 60 includes the light sensor assembly 70 to detect changes in light intensity. As will be illustrated and described below, an aspect of the present invention is the ability for a light detecting system, such as the light sensor assembly 70, to adapt to ambient light conditions. In this manner, the light detecting system may have an enhanced dynamic range. FIG. 2 is a diagram illustrating an embodiment of such a system in accordance with the present invention.

Referring now to FIGS. 1 and 2, the light sensor assembly 70 preferably includes a light filter 205, a sensor 210, and several circuits defining the light detecting electronics 215. While the interactive device 60 may include two sensors 210 representing two eyes, an embodiment of the present invention is described below in reference to a single sensor 210.

The light filter 205 is a component which filters light signals 200. The light filter 205 has infrared and near-red spectral transmission or transmissivity characteristics that allow filtered light 202 to pass through to the sensor 210. Furthermore, the filtered light 202 passes through to the sensor 210 while the light filter 205 advantageously appears dark or opaque. In the exemplary embodiment, the light filter 205 is made from a polycarbonate material marketed under the name of Makrolon and manufactured by Bayer Corporation of Germany. By having such a dark or opaque appearance, the light filter 205 meets the user's expectations that the interactive device's eye should be a dark color.

The light filter 205 is optically coupled to the sensor 210, preferably with clear optical epoxy. The light filter 205 and the sensor 210 are attached, preferably as one unit, to the interactive device 60 so that the light filter 205 can be exposed to the light 200.

The sensor 210 is a photodetector capable of providing a sensor signal, preferably a sensor current ($I_{SENSOR}$) 250, in proportion to the intensity of light sensed by the sensor 210. Thus, when the filtered light 202 hits the sensor 210, the sensor 210 operates as a current source. In the exemplary embodiment, the sensor 210 is a standard infrared NPN silicon phototransistor, Model LTR-4206 NPN T-1 manufactured by Lite-On, Inc. of Taipai, Taiwan R.O.C.

In order for the light sensor assembly 70 to function optimally, the spectral transmissivity and darkness of the light filter 205 should be matched against the sensitivity of the sensor 210. It is important to note that the farther the sensitivity of the sensor 210 is away from the infrared spectrum, the better a human hand can effectively cover and change the relative light intensity incident to the sensor 210. On the other hand, the light filter 210 becomes lighter in color as the spectral transmissivity of the light filter 210 moves away from the infrared spectrum.

To solve this dilemma, an embodiment of the present invention supports an optimal match of the spectral transmissivity characteristics of the light filter 205 with the spectral sensitivity of the sensor 210. In the exemplary embodiment, the transmissivity characteristics of the light filter 205 are matched to the sensor's sensitivity to achieve a peak sensitivity of 940 nanometers (nm) for the combination of the light filter 205 and the sensor 210. The peak sensitivity of the sensor 210 alone is for light having a wavelength above 940 nm while the transmissivity for the light filter 205 is best at approximately 800 nm. Thus, the important matching aspect is that the light filter 205/sensor 210 combination allows enough near-red light to pass through the light filter 205 to be sensed by the sensor 210 while simultaneously giving the light filter 205 its desired dark or opaque visual appearance.

As previously mentioned, when the filtered light 202 hits the sensor 210, the sensor 210 operates as a current source to provide the sensor signal, such as the sensor current 250, in proportion to the intensity of the incident filtered light 202. This sensor current 250 is received by the detecting electronics 215, more generally referred to as a detector. The detecting electronics 215 provides an output signal (e.g., the output voltage ($V_{OUT}$) 255) based upon relative changes in the sensor signal when compared to an ambient level of the sensor signal. The value of the $V_{OUT}$ 255 is altered when the ratio of the relative change in sensor signal and the ambient level of sensor signal is greater than a trigger value.

The trigger value is selected by design to be a threshold depending on how much of a relative change in light intensity is desired to indicate the sensor 210 is covered. Covering the sensor 210 is categorized as a transition to a darker light condition. Likewise, it follows that uncovering the sensor 210 is categorized as a transition to a brighter light condition. In the exemplary embodiment where a human hand is used to cover the sensor 210, the trigger value designed in the exemplary detecting electronics is approximately 50 percent of the ambient sensor current. Typically, the trigger value varies around the 50 percent level with the ambient light due to non-ideal characteristics of the actual implementation of the sensor assembly 70.

In an example where the trigger value is designed to be thirty percent, a detected twenty percent change in sensor current 250 relative to the ambient sensor current may not trigger the detection electronics 215 to alter $V_{OUT}$ 255. However, a detected fifty percent change in sensor current relative to the ambient sensor current triggers the detection electronics 215 to alter $V_{OUT}$ 255, thus indicating the light filter 205 is covered.

In summary, the trigger value is preferably set so that covering the sensor 210 results in a change in the sensor signal (when compared to the ambient level of the sensor signal) that is greater than the trigger value. In the exemplary embodiment, this trigger value should be less than fifty percent because a human hand typically blocks out about fifty percent of the light intensity incident on the sensor 210 when covering the sensor 210.

Describing the detecting electronics 215 in more detail, the circuits implementing the detecting electronics 215 include a controllable load 220, an integrator 225 and a comparator 230. Essentially, the controllable load 220 and the integrator 225 operate as a feedback loop, also called a feedback circuit, to implement the light sensor assembly's ability to adapt to the current ambient light conditions.

The controllable load 220 is coupled to the sensor 210 and accepts the sensor current 250 produced by the sensor 210. As the sensor current 250 passes through the controllable load 220, a detected signal, preferably a detected voltage ($V_{SENSE}$) 235, is provided across the controllable load 220. Those skilled in the art will appreciate that the value of $V_{SENSE}$ 235 is proportional to the variable impedance presented by the controllable load 220 and the value of $I_{SENSOR}$ 250.

As previously mentioned, the integrator 225 is a circuit that operates as part of the feedback loop in conjunction with the controllable load 220. The integrator 225 senses the value of $V_{SENSE}$ 235 across the controllable load 220. In response to sensing the value of $V_{SENSE}$ 235, the integrator 225 integrates the difference between the value of $V_{SENSE}$ 235 and the value of a reference signal, preferably a reference voltage ($V_{REF}$) 240, to produce a feedback signal 245. The integrator 225 produces the feedback signal 245 when there is a difference between $V_{SENSE}$ 235 and $V_{REF}$ 240. However, when there is no difference between $V_{SENSE}$ 235 and $V_{REF}$ 240, equilibrium is said to have been reached and the integrator 225 has fully adapted to the ambient light conditions incident to the sensor 210.

The feedback signal is used as a control signal to the controllable load 220 in order to close the feedback loop. As a control signal, the feedback signal 245 controls the variable impedance of the controllable load 220, which in turn adjusts the value of $V_{SENSE}$ 235 back to equilibrium, i.e., to the value of $V_{REF}$ 240, over an integration time.

A For example, when a relative change in light intensity is sensed by the sensor 210, the sensor current changes from its ambient value. The value of $V_{SENSE}$ 235 changes as a result of the relative change in sensor current 250 across the controllable load 220. The integrator 225 integrates the difference between the new or changed value of $V_{SENSE}$ 235 and the value of $V_{REF}$ 240 to produce the feedback signal. The value of the feedback signal 245 changes the impedance of the controllable load 220 in order to adjust the new value of $V_{SENSE}$ 235 to be closer to the value of $V_{REF}$ 240. Over an integration time, preferably defined as a conventional RC time constant, the feedback loop adjusts the value of $V_{SENSE}$ 235 back to the value of $V_{REF}$ 240. In summary, the feedback loop of the controllable load 220 and the integrator 225 detects relative changes in sensor current 250 compared to the ambient level of the sensor current 250 and is advantageously adaptive to the ambient light conditions.

The comparator 230 monitors the value of $V_{SENSE}$ 235 and the value of $V_{REF}$ 240 to provide $V_{OUT}$ 255. As mentioned in the above example, covering the light filter 205 causes a relative change in sensor current 250. The value of $V_{SENSE}$ 235 and the value of $V_{REF}$ 240 differ in response to the amount of relative change in sensor current 250. If the difference in the value of $V_{SENSE}$ 235 and the value of $V_{REF}$ 240 is greater than a preset value, the comparator 230 is deemed to be tripped and the value of $V_{OUT}$ 255 is altered to a logic "high" level. In the exemplary embodiment, the preset value is typically 150 millivolts. At the logic "high" level, $V_{OUT}$ 255 indicates that enough of a relative change in light intensity has been detected to identify that the sensor 210 has been covered or uncovered. Thus, the processing unit 62 within the interactive device 60 is able to sense the logic "high" level of $V_{OUT}$ 255 and respond accordingly.

After tripping the comparator 230, the value of $V_{SENSE}$ 235 and the value of $V_{REF}$ 240 begin to converge again according to the integration time defined by the integrator 225. At the beginning of the integration time, the difference in the value of $V_{SENSE}$ 235 and the value of $V_{REF}$ 240 represents the ratio of the relative change in sensor current when compared to the ambient sensor current. In other words, the difference at the beginning of the integration time represents the relative change in light intensity. Those skilled in the art will appreciate that the convergence of the value of $V_{SENSE}$ 235 and the value of $V_{REF}$ 240 is how the integrator 225 and the controllable load 220 adapt to the new ambient light conditions.

As the integration time elapses, the difference between the value of $V_{SENSE}$ 235 and the value of $V_{REF}$ 240 becomes less than the preset value. When the difference become less that the preset value, the comparator 230 alters the value of $V_{OUT}$ 255 back to a logic "low" level.

Adaptive Integration Time

In one embodiment of the present invention, the integration time is the same when covering and uncovering the sensor 210. Covering the sensor 210 is categorized as a transition from ambient light conditions to a darker light condition. Likewise, uncovering the sensor 210 is categorized as a transition from ambient light conditions to a brighter light condition. The same integration time may be used when the integrator 225 responds to a fifty percent drop in sensor current relative to the ambient sensor current and when the integrator 225 responds to a fifty percent increase in sensor current relative to the ambient sensor current. In certain circumstances, this may fit a user's expectations of how the interactive device 60 should respond.

In another embodiment of the present invention, the integrator's 225 integration time can be varied based upon whether the ambient light conditions are transitioning from either a darker light condition or a brighter light condition. This is advantageous because a fast recovery where the light sensor assembly 70 quickly adapts to the current ambient light conditions may be desirable in some circumstances. For example, a longer integration time may be desired when covering the sensor 210 as compared to when uncovering the sensor 210. The longer integration time may be desirable in an interactive game, such as peek-a-boo, because the game requires time for the interactive device 60 to respond and, subsequently, for the user to uncover the sensor 210. In such a situation, the integration time when transitioning from a brighter light condition (e.g., covering the light filter 205 and sensor 210) may be longer than a time threshold that a user is reasonably expected to be covering the sensor 210. In the exemplary embodiment, the expected time threshold is set approximately twenty to twenty five seconds.

When transitioning from a darker light condition (e.g., uncovering the light filter 205 and sensor 210), the integration time is less than the expected time threshold. This avoids waiting a longer period of time for the light sensor assembly 70 to adapt to the new ambient light conditions. In the exemplary embodiment, the integration time is typically less than one second when uncovering the sensor 210.

FIG. 3 is a more detailed diagram of the preferred components of the light sensor assembly 70 of FIG. 2 and illustrates how the integration time within the integrator 225 is adapted. Referring now to FIGS. 1 and 3, the integrator 225 is preferably implemented as a conventional integrating amplifier using an operational amplifier (U1) 305. A capacitor (C1) 310 is a capacitive element connected from the output of U1 305 to a negative input of U1 305, thus providing a feedback element across U1 305. A resistor (R1) 315 is a resistive element, which is connected between the negative input of U1 305 and $V_{REF}$ 240. A positive input of U1 305 is then connected to $V_{SENSE}$ 235 to complete the integrating amplifier. Thus, the output of U1 305 produces and provides the feedback signal 245 to the controllable load 220 based on the values of C1 310, R1 315, $V_{SENSE}$ 235, and $V_{REF}$ 240. In the exemplary embodiment, C1 310 has a value of 10 microfarads, R1 315 has a value of 5.1 megaohms, and $V_{REF}$ 240 is approximately 1.2 volts. Those skilled in the art will recognize that an integration time equaling an RC time constant is defined by the values of C1 310 and R1 315.

The conventional integrating amplifier (U1 305, C1 310, and R1 315) may be enhanced with the addition of a diode (D1) 320 connected across R1 315. Basically, the diode 320 is used to vary the integration time of the integrator 225 depending on the type of light transition. During dark to brighter light transitions (e.g., when uncovering the sensor 210), the value of $V_{SENSE}$ 235 becomes greater than the value of $V_{REF}$ 240 due to a relative increase in sensor current 250. One skilled in the art will appreciate that in such a situation, the diode 320 becomes forward biased and becomes a low impedance across R1 315. As a result of forward biasing the diode 320, the integration time is reduced to a substantially small amount of time by the combined low impedance of the diode 320 in parallel with R1 315. One skilled in the art will recognize that the actual time of the reduced integration time can be arbitrarily set depending upon the actual impedance characteristics of the diode 320 and R1 315.

Furthermore, one skilled in the art will appreciate that the diode 320 will remain at a high impedance during light to darker light transitions, such as when covering the sensor 210. This is because the diode 320 will be reverse biased during light to dark transitions. Thus, during light to dark light transitions, U1 305 produces and provides the feedback signal 245 to the controllable load 220 under a standard integration time defined by the values of R1 315 and C1 310.

The feedback signal 245 is then used by the controllable load 220. Describing the controllable load 220 in more detail, the controllable load 220 essentially uses the feedback signal 245 to selectively adjust its impedance. The controllable load 220 is preferably made up of a transistor (Q1) 325 and four resistors (R2 330, R3 335, R4 340, and R5 345). The feedback signal 245 is provided to R2 330, which is connected in series with R3 335, which is further connected to ground, in a voltage divider network. In the exemplary embodiment, R2 330 has a value of 2700 ohms and R3 335 has a value of 1500 ohms.

The base of Q1 325 is connected to the voltage divider network between R2 330 and R3 335. The collector of Q1 325 is connected to the output of the sensor 210 while the emitter of Q1 325 is connected to R4 340, which is then connected to ground. R5 345 is connected in parallel to the series combination of Q1 325 and R4 340. In the exemplary embodiment, R4 340 has a value of 51 ohms and R5 345 has a value of 5.1 megaohms.

In the exemplary embodiment of the controllable load 220, Q1 325 sinks a controlled amount of the sensor current 250 based upon the level of the feedback signal 245 from the integrator 225. By sinking a portion of the sensor current 250 and preventing that portion from running into R5 345, those skilled in the art will recognize that the feedback signal 245 controls the combined effective impedance of the controllable load 220. As a result of controlling the effective impedance of the controllable load 220, the integrator 225 can adjust the level of $V_{SENSE}$ 235. Therefore, the integrator 225 and the controllable load 220 make up the feedback loop, which appropriately adjusts the level of $V_{SENSE}$ 235 upon relative changes in sensed light intensity.

In summary, in one embodiment of the present invention, the integration time is less than the expected time for a user's response when a relative change in light intensity is detected when transitioning from a darker light condition. This is because the forward biased diode D1 320 reducing the impedance for the RC time constant defining the integration time in the integrator 225. However, in response to a detected relative change in light intensity when transitioning from a brighter light condition, the integration time is not substantially small. In fact, the integration time is greater than the expected time for a user's response, which is typically twenty to twenty five seconds. In this way, the light sensor assembly 70 can adapt to the user's expectations when covering and uncovering sensors 210 on the interactive device 60.

Timer Circuit

Another aspect of the present invention involves resetting the integration time of the integrator 225 when there has been no relative change in light intensity on the sensor 210 after a predefined time period. The integration time is typically set longer than the expected threshold time within which a user is to respond. However, after the expected threshold time has elapsed, it is desirable to quickly force the integrator 225 back to equilibrium (i.e., to bring the value of $V_{SENSE}$ 235 back to the value of $V_{REF}$ 240). Otherwise, the integrator 225 will come back to equilibrium only after the integration time elapses. Thus, resetting the integration time after a predefined maximum time period (typically longer than the threshold time to expect user responses) may be desirable in order to quickly adapt to the current ambient light conditions.

In addition to the other circuit components of the detecting electronics 215, FIG. 3 illustrates a timer circuit for providing a reset signal to reset the value of the integrator's integration time. Still referring to FIGS. 1 and 3, the timer circuit 350 is used with the integrator 225 and comparator 230 to provide a reset signal 355. The timer circuit 350 monitors $V_{OUT}$ 255. When $V_{OUT}$ 255 is altered in a low-to-high logic level transition by the comparator 230, the timer circuit 350 is triggered. Upon being triggered, the timer circuit 350 provides the reset signal 355 to the integrator 225 after the predefined maximum time period. In the exemplary embodiment, the predefined maximum time period is approximately 25 seconds while the RC time constant of the integrator 225 is typically set to provide an adaption time of over 30 seconds. Thus, the timer circuit 350 is designed to reset the integrator 225 before the integrator 225 can fully adapt to a dark condition. This ensures that the integrator 225 does not overly adapt to being covered.

When resetting the integrator 225, the reset signal 355 operates to temporarily change the integration time of the integrator 225 so that equilibrium is quickly reached (i.e., the value of $V_{SENSE}$ 235 converges on the value of $V_{REF}$ 240). In the exemplary embodiment, the reset signal 355 intervenes to rapidly charge C1 310 and circumvent the normal integration time associated with the integrator 225.

In summary, the timer circuit 350 (and its reset signal 355) is useful to force the feedback loop to come to equilibrium once a predefined period of time has elapsed since a relative light intensity change triggered the comparator 230.

Process of Detecting a Relative Change in Light Intensity

FIG. 4 is a flow diagram of steps for detecting a relative change in light intensity according to an exemplary embodiment of the present invention. These steps are described in terms of the light filter 205, sensor 210, and detection electronics 215 as illustrated in FIGS. 1–3. Referring now to FIGS. 1, 3 and 4A, the preferred method 400 begins at step 405 where a sensor signal, such as the sensor current 250, is provided to a detector, such as the detection electronics 215. The value of the sensor signal corresponds to the light intensity.

At step 410, a relative change in light intensity occurs. This may be categorized as a transition from a darker light condition (e.g., when uncovering the light filter 205 and sensor 210) or a transition from a brighter light condition (e.g., when covering the light filter 205).

At step 415, a relative change in the sensor signal is detected due to the relative change in light intensity. In the exemplary embodiment, a relative change in the sensor current 250 is produced by the sensor 210 and detected by the detecting electronics 215 when the light intensity on the light filter 205 changes.

At step 420, a change in a detector signal is detected. As previously described, the detector signal is responsive to the relative change in the sensor signal. In the exemplary embodiment where the detector signal is a sensed voltage, $V_{SENSE}$ 235, across the controllable load 220, the detector signal is detected by the integrator 225.

When there has not been a change in light intensity, the ambient value of the detector signal, such as the value of $V_{SENSE}$ 235, is equal to the value of a reference signal, such as the value of $V_{REF}$ 240. Those skilled in the art will appreciate that this is how the detecting electronics 215 adapts and is able to detect changes relative to any ambient light condition.

At step 425, the integrator determines a difference between the value of the detector signal and the value of a reference signal, such as $V_{REF}$ 240. Thus, the difference between the value of the detector signal and the value of a reference signal represents a ratio of a relative change in sensor current 250 and the ambient sensor current 250.

At step 430, if the difference is greater than a preset value, then step 430 proceeds to step 435. Otherwise, the relative change in light intensity is not great enough to indicate the light filter 205 was covered or uncovered and step 430 proceeds directly to step 445 on FIG. 4B.

At step 435, an output signal (such as $V_{OUT}$ 255) is altered by the comparator 230 to indicate the relative change in light intensity. In the exemplary embodiment, the output signal is provided to a processing unit 62 within the interactive device 60.

At step 440, the processing unit 62 is then able to cause the interactive device 60 to respond based on the value of the received output signal. In one example, the processing unit 62 may respond by causing the interactive device 60 to make a sound. This is done by providing input to the speech synthesizer 63 to produce a sound played through the device's speaker 71. In another example, the processing unit may respond by causing the interactive device 60 to physically move. This is done by actuating one or more of the servo motors 69 in the interactive device 62.

Referring now to FIGS. 1, 3, 4A, and 4B, steps 445–490 are where the system adapts to the current ambient light conditions according to an integration time. As previously discussed, the integration time may vary depending on the type of relative change in light intensity which occurred at step 410.

At step 445, if the relative light intensity change is a transition from a brighter light condition (e.g., the light filter 205 on the interactive device 62 is covered by a human hand), then step 445 proceeds directly to step 465. Otherwise, step 445 proceeds to step 450 because the relative light intensity change is a transition from a darker light condition.

At step 450, the integration time is set less than an expected threshold period of time that the light filter 205 should expect to be normally covered. In the exemplary embodiment, this is accomplished by reducing the effective impedance of the resistive element (R1 315) of the integrator's integrating amplifier.

At step 455, a feedback signal is provided to the controllable load 220 in order to adjust the value of the detector signal back to the value of the reference signal over the integration time. In the exemplary embodiment, the feedback signal 245 is provided by the integrator 225. The integrator 225 integrates a difference between the value of $V_{SENSE}$ 235 and the value of $V_{REF}$ 240 to produce the feedback signal, which is then provided to the controllable load 220. The feedback loop comprising the integrator 225 and the controllable load 220 are able to adjust the value of $V_{SENSE}$ 235 back to the value of $V_{REF}$ 240. Once the integration time has elapsed at step 460, equilibrium has been reached and step 460 proceeds back to step 415. In this manner, the integrator 230 quickly adapts to the ambient light conditions.

Those skilled in the art will appreciate that steps 450–460 provide the preferred steps for adapting to the ambient light conditions presented to the light filter 205 when transitioning from a darker light condition (e.g., when uncovering the light filter 210). Although not shown in FIG. 4B, it should be understood that if another relative change in light intensity occurs between steps 455 and 460, the method 400 may proceed back to step 415.

Similar to steps 450–460, steps 465–490 provide the preferred steps for adapting to the ambient light conditions presented to the light filter 205 when transitioning from a brighter light condition (e.g., when covering the light filter 205). At step 465, the integration time is set greater than the expected threshold period of time that the sensor should be normally covered. In the exemplary embodiment, this is implemented with the inherent RC time constant defined by R1 315 and C1 310 within the integrator 225.

At step 470, the feedback signal is provided to the controllable load 220 in order to adjust the value of the detector signal back to the value of the reference signal over the integration time defined by the RC time constant. At step 475, if a predetermined maximum period of time has not yet elapsed, step 475 proceeds back to step 470. The predetermined maximum period of time is typically more than the expected time that the light filter 205 should be normally covered but less than the integration time defined by the RC time constant.

However, if the predetermined maximum period of time has elapsed, step 475 proceeds to step 480 where the integration time is reset by the timer circuit 350. The integration time is reset when a reset signal, such as the reset signal 355 from the timer circuit 350, is provided at step 480. Once the integration time has been reset via the reset signal, the integrator 225 quickly adjusts to the ambient light conditions. Thus, at step 485, the value of the detector signal is adjusted back to the value of the reference signal over the reset integration time by providing the feedback signal to the controllable load 220.

If the integration time has elapsed at step 490, equilibrium has been reached and step 490 proceeds back to step 415. Otherwise, step 490 proceeds back to step 485 to continue adjusting the detector signal. In this manner, the integrator 230 adapts to the ambient light conditions.

In summary, steps 465–490 (similar to steps 450–460) illustrate the preferred steps for adapting to the current ambient light conditions. It is important to note that if another relative change in light intensity occurs between steps 465–490, the method 400 proceeds immediately back to step 415.

Conclusion

From the foregoing description, it will be appreciated that the present invention provides a system for detecting a relative change in light intensity. The exemplary system includes an interactive device 60 and a light sensor assembly 70. The light sensor assembly 70 includes a light filter 205, a sensor 210, and detecting electronics 215. The light filter 205 is matched to the sensor 210 to allow enough light to be sensed while still appearing to be dark or opaque. The sensor 210 produces a sensor signal or sensor current 250 proportional to light coming through the light filter 205 and hitting the sensor 210. The detecting electronics 215 includes a feedback loop of a controllable load 220 and an integrator 225. The controllable load receives the sensor current 250 to provide a detector signal, such as the detected voltage 235. A difference between the value of the detected voltage 235 and the value of the reference voltage 240 is integrated by the integrator 225 over an integration time to produce a feedback signal 245. The feedback signal 245 controls the impedance of the controllable load 220. Furthermore, the feedback signal 245 completes the feedback loop by adjusting the value of the detected voltage 235 back to the value of the reference voltage 240 over an integration time. In this manner, the detecting electronics 215 detects changes in relative light intensities while thereafter adjusting to the ambient light conditions.

In one embodiment of the present invention, the integration time is adapted to meet with a user's expectations. When transitioning from a dark to a brighter light condition incident to the sensor 210, the integration time is reduced within the integrator 225. The reduction in integration time is implemented using a forward biased diode 320 in parallel with a resistive element defining the integrator's integration time (e.g., an RC time constant).

The detecting electronics 215 also includes a comparator 230. When the difference between the value of the detected voltage 235 to the value of the reference voltage 240 is greater than a preset value, the comparator 230 is triggered to alter the value of an output voltage. The altered value of the output voltage 255 indicates enough of a relative change in light intensity so that the interactive device 60 can appropriately respond.

In another embodiment of the present invention, a timer circuit 350 is used to reset the integrator's integration time after a predefined period of time elapses. The timer circuit resets the integration time by providing a reset signal 355 to the integrator 220 once a predefined period of time elapses after the sensor 210 is covered or uncovered.

The foregoing system may be conveniently implemented in circuits that are based upon the schematic and block diagrams in FIGS. 2 and 3. Some circuit components for implementing the various circuits and devices have not been described above because it is considered that the system described above and illustrated in the accompanying drawings is sufficiently disclosed to permit one of ordinary skill in the art to practice the present invention.

The present invention has been described in relation to particular embodiments which are intended in all respects to be illustrative rather than restrictive. The exemplary embodiment described is one of a remotely controllable toy, capable of stand-alone operation and having on-board electronic circuits capable of adaptively sensing near-red to infrared light in a broad range of ambient light conditions through a dark colored light filter. However, those skilled in the art will understand that the principles of the present invention apply to any light detecting circuit.

Alternative embodiments will become apparent to those skilled in the art to which the present invention pertains without departing from its spirit and scope. Accordingly, the scope of the present invention is defined by the appended claims rather than the foregoing description.

What is claimed is:

1. A system for detecting a relative change in light intensity, comprising:
   a sensor, coupled to an interactive device, operable for producing a sensor signal in proportion to light intensity detected by the sensor; and
   a detector operable for
     receiving the sensor signal,
     producing an ambient value of the sensor signal representative of the value of the sensor signal during a previous time period,
     altering an output signal from a first logic level to a second logic level in response to the ratio of the instantaneous value of the sensor signal to the ambient value of the sensor signal exceeding a predefined trigger value, and
     providing the output signal to the interactive device to indicate whether the relative change in light intensity has been detected.

2. The system of claim 1, wherein:
   the detector further comprises a feedback circuit coupled to the sensor for providing a detected signal responsive to the sensor signal, and a comparator coupled to the feedback circuit for altering the value of the output signal from the first logic level to the second logic level in response to a difference between the detected signal and a reference signal greater than a preset value, and;
   the feedback circuit is further operative to integrate the difference between the detected signal and the reference signal over an integration time to provide a feedback signal, and to adjust the value of the detected signal back to the value of the reference signal in response to the value of the feedback signal; and
   the comparator is operative to return the value of output signal from the second logic to the first logic level in response to the value of the detected signal returning to the value of the reference signal.

3. The system of claim 2, wherein the interactive device comprises a processing unit to receive the output signal and to cause the interactive device to physically respond to the value of the output signal.

4. The system of claim 1 further comprising a light filter, optically coupled to the sensor, for accepting light and providing filtered light to the sensor.

5. The system of claim 4, wherein the light filter has a spectral transmissivity characteristic allowing the light to pass through the light filter and to be provided to the sensor while also giving the light filter a dark appearance in color.

6. The system of claim 1, wherein the detector further comprises:
   a feedback circuit coupled to the sensor, the feedback circuit for providing a detected signal responsive to the sensor signal; and
   a comparator, coupled to the feedback circuit, for altering the value of the output signal from the first logic level to the second logic level based on a difference between the detected signal and a reference signal.

7. The system of claim 6, wherein the feedback circuit is operative, in response to the relative change in the light intensity, to:
   integrate the difference between the detected signal and the reference signal over an integration time to provide a feedback signal; and
   adjust the value of the detected signal back to the value of the reference signal in response to the value of the feedback signal.

8. The system of claim 7, wherein the comparator is operative to alter the output signal if the difference between the detected signal and the reference signal is greater than a preset value.

9. The system of claim 7, wherein the feedback circuit is further operative to vary the integration time depending on whether the relative change in light intensity is generated by an increase or a decrease in the light intensity.

10. The system of claim 9, wherein the integration time is less than an expected threshold period of time when the relative change in the light intensity is generated by an increase in the light intensity.

11. The system of claim 9, wherein the integration time is greater than an expected threshold period of time when the relative change in the light intensity is generated by a decrease in the light intensity.

12. The system of claim 7 further comprising a timer circuit connected to the feedback circuit, the timer circuit providing a reset signal to the detector at a predefined maximum time period after the detector has altered the output signal from the first logic level to the second logic level; and
   wherein the detector is further operative to adjust the value of the detected signal back to the value of the reference signal, return the output signal from the second logic value to the first logic value, and vary the integration time upon receiving the reset signal.

13. The system of claim 9, wherein the feedback circuit is further operative to reset the integration time upon receiving the reset signal from the timer circuit.

14. A system for detecting a relative change in light intensity, comprising:
   an interactive device;
   a sensor, coupled to the interactive device, for producing a sensor signal in proportion to light intensity detected by the sensor;
   a controllable load coupled to the sensor for receiving the sensor signal, the controllable load providing a detector signal responsive to the sensor signal;
   an integrator coupled to the controllable load, the integrator providing a feedback signal to the controllable load in response to a difference between the detector signal and a reference signal;
   a comparator coupled to the integrator, the comparator providing an output signal based on the difference between the detector signal and the reference signal;
   the integrator further operative to sense a changed value of the detector signal in response to the relative change in the sensor signal, integrate the difference between the changed value of the detector signal and the value of the reference signal over an integration time to provide a feedback signal, and provide the feedback signal to the controllable load;
   the controllable load further operative to adjust the value of the detector signal back to the value of the reference signal in response to the feedback signal; and
   the comparator further operative to alter the output signal from a first logic level to a second logic level if the difference between the detector signal and the reference signal is greater than a preset value to indicate that a relative change in the light intensity has occurred.

15. The system of claim 14, wherein the comparator is electronically coupled to a processing unit within the interactive device and wherein the comparator is further operative to provide the output signal to the interactive device to indicate whether the relative change in the light intensity has been detected.

16. The system of claim 15, wherein the processing unit is further operative to receive the output signal and to cause the interactive device to physically respond to the value of the output signal.

17. The system of claim 14 further comprising a light filter, optically coupled to the sensor, for accepting light and providing filtered light to the sensor, the light filter appealing as an opaque eye on the interactive device.

18. The system of claim 17, wherein the light filter has a spectral transmissivity characteristic allowing a near-red part of the light to pass through the light filter and to be provided to the sensor while also allowing an infrared part of the light to pass through the light filter to give the light filter a dark appearance in color.

19. The system of claim 14, wherein the integrator comprises an integrating amplifier having a resistive element and a capacitive element defining the integration time as an RC time constant.

20. The system of claim 19, wherein the integrator further comprises a diode across the resistive element, the diode reducing the integration time to less than an expected threshold period of time when the relative change in the light intensity is caused by uncovering the sensor on the interactive device.

21. The system of claim 20, wherein the integration time is greater than the expected threshold period of time when the relative change in the light intensity is caused by covering the sensor on the interactive device.

22. The system of claim 19 further comprising a timer circuit connected to the integrator and responsive to the output signal, the timer circuit providing a reset signal to the integrator at a predefined maximum time period after the output signal has been altered by the comparator; and wherein the integrator is further operative to reset the integration time upon receiving the reset signal by promptly charging the capacitive element.

23. A method for detecting a relative change in light intensity, the method comprising the steps of:

(1) detecting a relative change in a sensor signal corresponding to light intensity detected by the sensor;

(2) detecting a changed value of a detector signal in response to the relative change in the sensor signal;

(3) if a difference between the changed value of the detector signal and a value of a reference signal is greater than a preset value, then altering an output signal from a first logic level to a second logic level to indicate that a relative change in the light intensity has occurred; and (4) providing a feedback signal for adjusting the changed value of the detector signal back to the value of the reference signal over an integration time.

24. The method of claim 23 further comprising the step, prior to step (1), of providing the sensor signal corresponding to the relative change in the light intensity.

25. The method of claim 23 further comprising the step of causing an interactive device to make a sound in response to altering the output signal.

26. The method of claim 23 further comprising the step of causing an interactive device to physically move in response to altering the output signal.

27. The method of claim 23 further comprising the step, before step (1), of transitioning from a brighter light condition to produce the relative change in the light intensity; and wherein step (4) further comprises providing the feedback signal over the integration time which is greater than an expected threshold period of time.

28. The method of claim 27 further comprising the steps, after step (4), of:

waiting for a predefined period of time after altering the value of the output signal;

providing a reset signal to reset the integration time; and adjusting the value of the detector signal to the value of the reference signal over the reset integration time.

29. The method of claim 23 further comprising the step, before step (1), of transitioning from a darker light condition to produce the relative change in the light intensity; and wherein step (4) further comprises providing the feedback signal over the integration time which is less than an expected threshold period of time.

* * * * *